(12) United States Patent
Azuma

(10) Patent No.: US 6,311,652 B2
(45) Date of Patent: Nov. 6, 2001

(54) METHOD OF REPAIRING A CYLINDER HEAD HAVING COOLING WATER PASSAGES

(75) Inventor: Kazuo Azuma, Yokosuka (JP)

(73) Assignee: Toei Engineering Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/774,043

(22) Filed: Jan. 31, 2001

Related U.S. Application Data

(62) Division of application No. 09/239,765, filed on Jan. 29, 1999, now Pat. No. 6,195,886.

(30) Foreign Application Priority Data

Oct. 21, 1998 (JP) .................................................. 10-299637

(51) Int. Cl.$^7$ ...................................................... F02F 1/36
(52) U.S. Cl. ..................................................... 123/41.82 R
(58) Field of Search ........................... 123/41.79, 41.8, 123/41.82 R, 193.5; 29/888.011, 888.06

(56) References Cited

U.S. PATENT DOCUMENTS

| | | | |
|---|---|---|---|
| 3,450,575 | * | 6/1969 | Riscky ................................. 148/243 |
| 3,659,569 | * | 5/1972 | Mayer et al. ....................... 123/41.79 |
| 4,794,884 | * | 1/1989 | Hilker et al. ....................... 123/41.79 |
| 5,211,137 | * | 5/1993 | Kawauchi et al. ................ 123/41.79 |
| 5,386,805 | * | 2/1995 | Abe et al. .......................... 123/41.28 |
| 5,535,714 | * | 7/1996 | Aoyama et al. .................. 123/193.5 |
| 6,167,848 | * | 1/2001 | Frantzheld ........................ 123/41.79 |

* cited by examiner

Primary Examiner—Tony M. Argenbright
Assistant Examiner—Hai Huynh
(74) Attorney, Agent, or Firm—Michael D. Bednarek; Shaw Pittman LLP

(57) ABSTRACT

A method of repairing a cylinder head of a water cooled internal combustion engine that has damage to the boundary wall between a cooling water passage and the combustion chamber. According to the method, the boundary wall B located between a cooling water passage and a combustion chamber and including a crack is cut away from a cylinder head until the cut reaches a depth of one half the cross section of the cooling water passage. Then, a half-pipe portion, having a semicircular cross section that is equal in size to one-half the cross section of the cooling water passage is fixed in the cylinder head from which the boundary wall B has been removed such that an inner surface of the half-pipe may serve to form a cooling water passage after repair. With the use of the above method, the repair operation is completed easily with a low cost because the boundary wall B has only to be cut away to a shallow depth. Further, the use of a half-pipe portion, together with the remainder of the original cooling water passage ensures that the cooling water passage will be restored to its original state.

2 Claims, 6 Drawing Sheets

F I G. 1
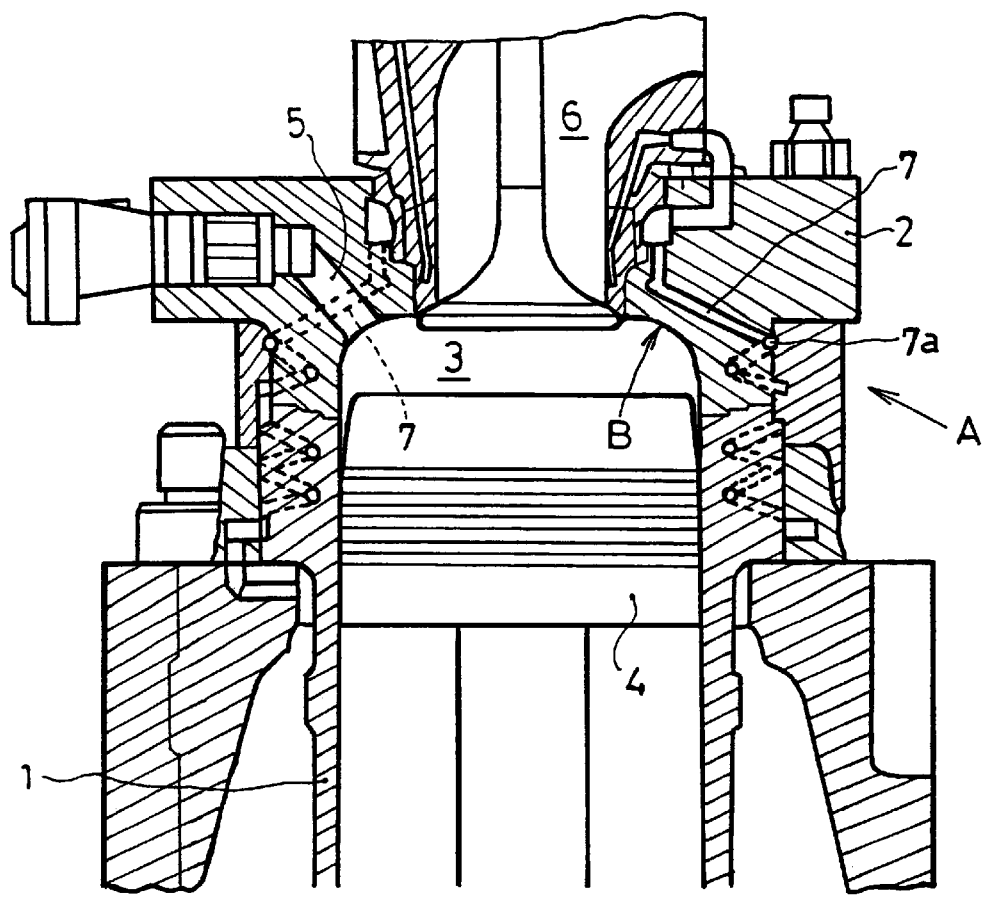

METHOD OF REPAIRING A CYLINDER HEAD HAVING COOLING WATER PASSAGES

This application is a divisional of Ser. No. 09/239,765 filed on Jan. 29, 1999 now U.S. Pat. No. 6,195,886.

BACKGROUND OF THE INVENTION

1. Field of the Invention

The present invention relates to a method of repairing a cylinder head of a water cooling type internal combustion engine, in particular, to a method of repairing a broken portion within the cylinder head located between a cooling water passage and the combustion chamber.

2. Description of the Related Art

A water cooling type internal combustion engine usually has cooling water passages formed within a cylinder head which defines in itself a combustion chamber for the engine. It has been found that cracks, other damage and even broken portions within the cylinder head between the cooling water passage and the combustion chamber will occur after a long-period use of such internal combustion engine.

It is desirable to repair, rather than replace, damaged or broken portions. However, to make repair of the broken portions of a cylinder head of an internal combustion engine a viable option, it is required that the repairing process be accomplished easily, at a low cost and that a damaged cylinder head be restored to its original state and provide its predetermined performance after repairing.

It is an object of the present invention to provide a novel and useful method of repairing a cylinder head of an internal combustion engine, so as to satisfy and meet the above requirements.

SUMMARY OF THE INVENTION

To achieve the above-described object of the present invention, the present invention provides an improved method for repairing a cylinder head of an internal combustion engine. The method comprises the steps of: cutting away the boundary walls including broken portions, preferably until the cut reaches a depth of one-half the cross section of the cooling water passage; fixing pipe portions, preferably half-pipes each having a semicircular cross section which is equal in size to one-half the cross section of the cooling water passage, in the cylinder head from which the boundary walls have been partially removed in a manner such that an inner surface of a half-pipe portion may serve to form a cooling water passage after repairing treatment.

By virtue of the method according to the present invention, the repair operation can be completed easily at a low cost because the cylinder head need only be cut away to a shallow depth. Further, at least a part of a cooling water passage is formed by the inner surface of a half-pipe having a semicircular cross section that is equal in size to one-half the cross section of the cooling water passage. As a result, the remaining portion of the original passage serves as a guide to ensure that the cooling water passage is restored to its original state. In this way engine performance is maintained.

In accordance with a preferred embodiment, prior to the step of fixing a half-pipe in a predetermined position, a guide member having an outer periphery surface that conforms to the corresponding cooling water passage without forming any clearance therebetween, is inserted in the cooling water passage to be repaired. In this way, the outer periphery surface of a guide member may serve as a positioning member for positioning a pipe portion so that the half-pipe may be attached at a correct position with precision. This step ensures easy attachment of each of the half-pipe portions. Moreover, when a half-pipe is being fixed in position by means of welding, the outer periphery surface of a guide member can serve to prevent molten metal from entering a cooling water passage.

BRIEF DESCRIPTION OF THE DRAWINGS

FIG. 1 is a cross sectional view of a part of a water cooling type internal combustion engine containing a cylinder head suitable to be repaired by the method according to one embodiment of the present invention.

DESCRIPTION OF THE PREFERRED EMBODIMENTS

Figure 2:
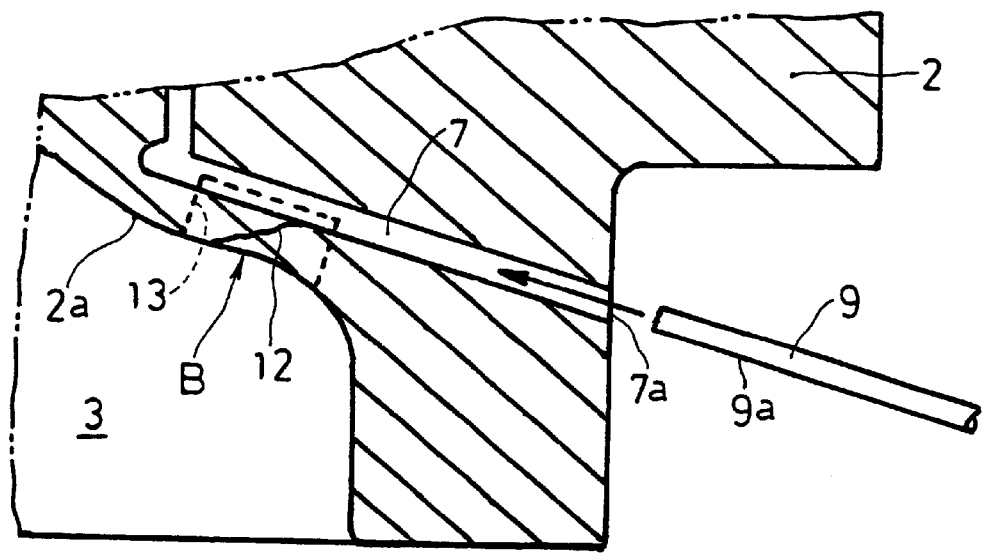
FIG. 2 is an enlarged sectional view indicating an essential part of the cylinder head of FIG. 1.

Referring to FIG. 1, a water cooling type internal combustion engine includes a cylinder 1, a cylinder head 2 secured on the cylinder 1, a piston 4 capable of reciprocating within the cylinder 1, a combustion chamber 3 defined by the cylinder 1 and the cylinder head 2 and the piston 4, an intake port 5 for intaking a mixed gas into the combustion chamber 3, and an exhaust port 6 for exhausting burned gas from the combustion chamber 3. The exhaust port 6 extends through the central portion of the cylinder head 2.

Figure 3:
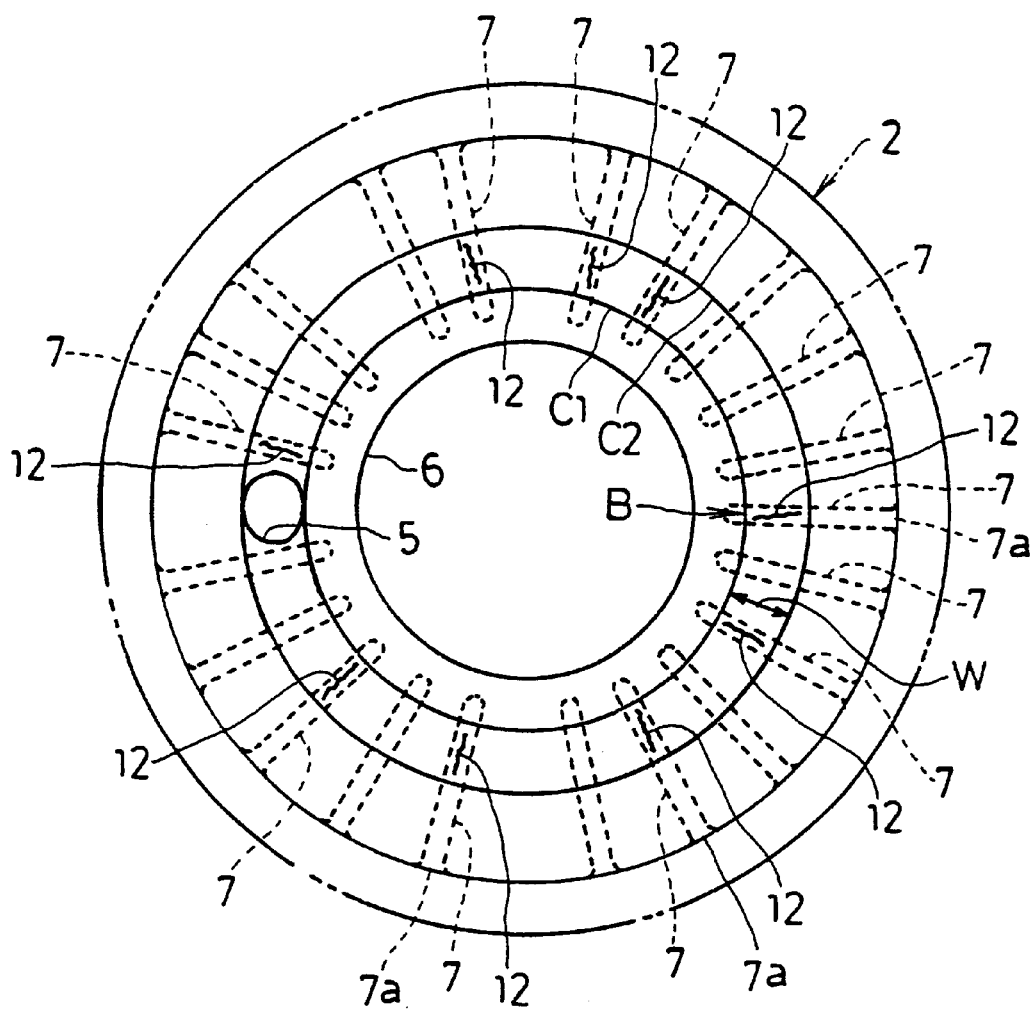
FIG. 3 is a top plane view indicating the cylinder head of FIG. 1, when viewed from the combustion chamber.

The cylinder head 2 contains a plurality of cooling fluid passages (cooling water passages) 7 each having a circular cross section and having an opening 7a on the outer surface of the cylinder head 2. FIG. 3 is a top plane view indicating the cylinder head of FIG. 1, when viewed from the combustion chamber 3. As can be clearly seen from FIG. 3, the plurality of cooling water passages 7 are arranged to extend radially within the cylinder head 2. In this manner, the cooling fluid (the cooling water) flowing through these cooling water passages 7 cools the cylinder head 2. In one embodiment, the cooling water passages 7 are formed by boring in the direction shown by an arrow A in FIG. 1 from the outer surface of the cylinder head 2 prior to the assembling of the entire engine.

Referring to FIG. 2, in the cylinder head 2, it has been found that a boundary wall B, located between a cooling water passage 7 and the combustion chamber 3, is likely to be broken after a long period use of the internal combustion engine. The most frequently occurring phenomenon is a crack 12. In accordance with the present embodiment, a cylinder head 2 (see FIG. 3) having a plurality of cracks 12 corresponding to the plurality of cooling water passages 7 may be repaired according to a method that will be described in detail below.

To begin with, a damaged cylinder head 2 is removed from the cylinder 1. Then, as shown in FIG. 2, a boundary wall B including a crack 12 is cut down to a half depth of the cross section of a cooling water passage 7, with the use of a cutting machine such as a working lathe. Further, in the present embodiment, as shown in FIG. 2, an area represented by a broken line is about to be removed. Moreover, according to the present embodiment, when a plurality of cracks 12 are to be repaired at the same time, an annular portion between a circle C1 and a circle C2 is removed therefrom, as shown in FIG. 3. Once this annular portion is removed, an annular groove 13 continuously connected with the cooling water passage surfaces 7b (see FIG. 9) each having a semicircular cross section, is formed on the inner surface 2a of the combustion chamber 3 within the cylinder head 2.

Second, preferably, as shown in FIG. 2, a guide member 9 is inserted from the opening 7a of the cooling water passage 7 inwardly to the interior of the cooling water passage 7. This guide member 9, as shown in FIGS. 6–9, has an outer periphery surface 9a conformable with the cooling water passage 7 without forming any clearance.

Figure 6:
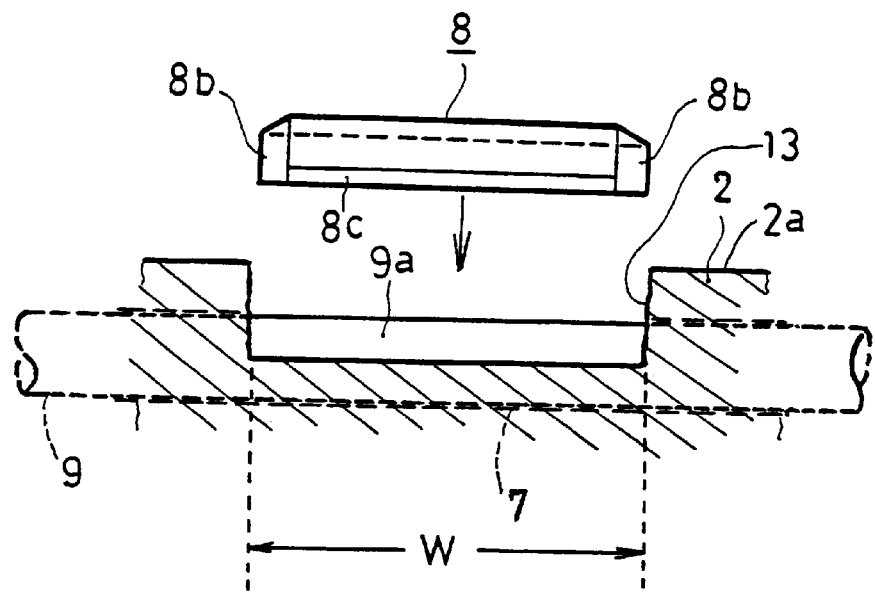
FIG. 6 is an explanatory view indicating one step of the method according to one embodiment of the present invention.
Figure 7:
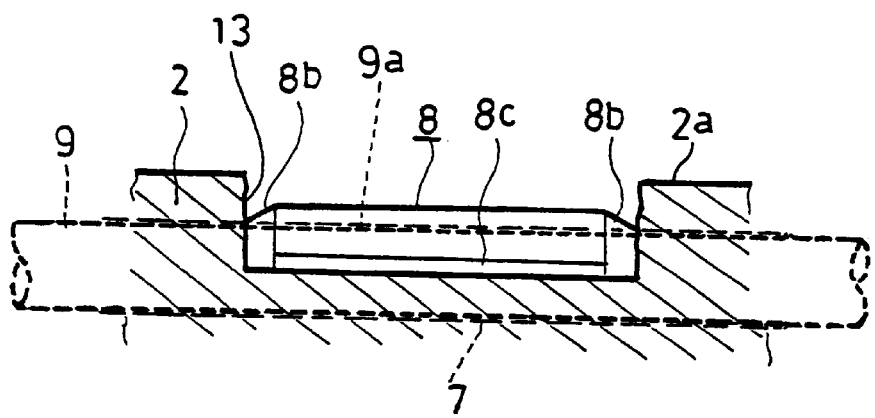
FIG. 7 is an explanatory view indicating one step of the method according to one embodiment of the present invention.

Such guide member 9 is made of copper or brass. Preferably, the guide member 9 is formed of a material which is capable of preventing a molten metal such as a filler metal or base metal from adhering to the surface thereof. Further, the guide member 9 may be made of either a solid rod or a hollow pipe. With the guide member 9 inserted in the cooling water passage 7, as shown in FIG. 6, the outer periphery surface 9a of the guide member 9 will be exposed in the groove 13.

Figure 4:
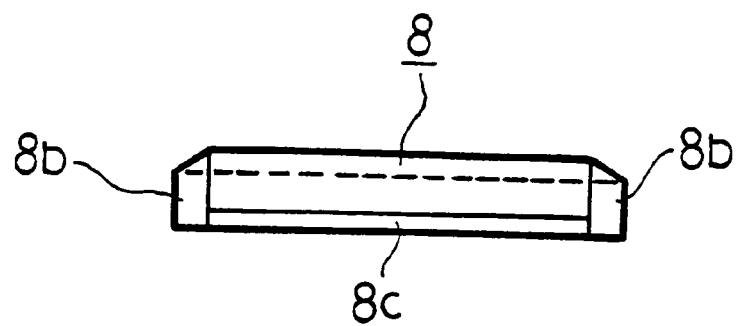
FIG. 4 is a side view indicating a half-pipe.
Figure 5:
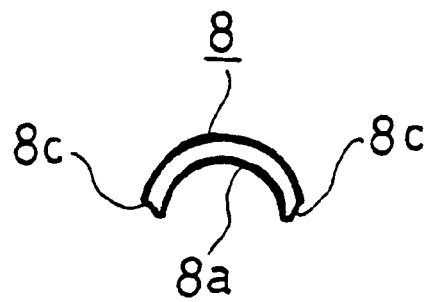
FIG. 5 is a front view of the half-pipe.
Figure 8:
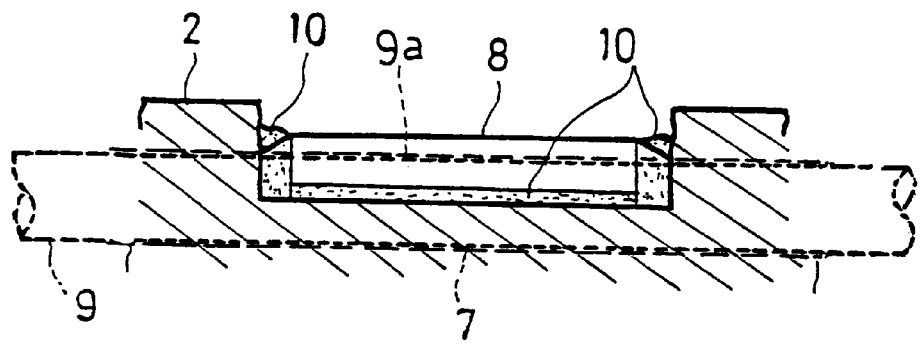
FIG. 8 is an explanatory view indicating one step of the method according to one embodiment of the present invention.

Afterwards, each of the cooling water passages 7 is treated in the following manner. Namely, as shown in FIG. 8, a half-pipe 8 shown in FIGS. 4 and 5 is fixed within the groove 13 of the cylinder head 2 by means of welding such as TIG (Tungsten Inert Gas) arc welding, MIG (Metallic Inert Gas) arc welding or submerged arc welding, with the use of a filler metal 10. Under this condition, it is preferable that the welding operation be performed after welding portions have been preheated to a temperature of 100–150° C. with the use of a gas burner.

Figure 9:
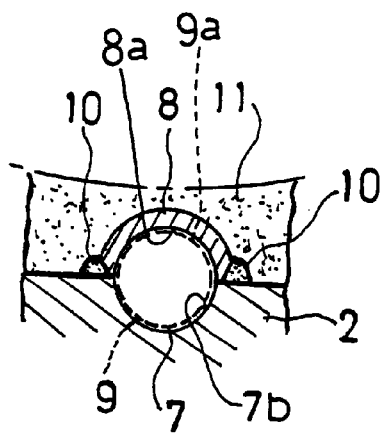
FIG. 9 is a cross sectional view indicating a part of a cylinder head repaired by the method according to one embodiment of the present invention.

Each half-pipe 8, upon being fixed in position as shown in FIG. 9, has a semicircular cross section which is as large as the half of the cross section of a cooling water passage 7. Therefore, as shown in FIG. 5, the inner surface 8a of each half-pipe 8 is the same as the half of a cooling water passage 7. Further, each half-pipe 8, as shown in FIG. 6, has a length which is equal to the width W (see FIG. 3) of a groove 13. In this way, as shown in FIG. 6, a half-pipe 8 is mounted on the guide member 9 so as to cover up the outer surface 9a of the guide member 9, which was previously exposed in the groove 13. At this time, as shown in FIG. 9, the inner surface 8a of the half-pipe 8, together with the inner surface 7b of the cooling water passage 7 having a semicircular cross section, serve to define a cooling water passage 7 upon completion of the repairing of the engine.

In this way, with the use of the guide member 9, it is sure that the half-pipe 8 may be attached in position with a great ease and that such attachment will be accomplished with an improved accuracy.

Further, after the half-pipe 8 is welded into the cylinder head 2, the outer surface 9a of the guide member 9 may serve to prevent molten metal from invading into the cooling water passage 7. Since the guide member 9 is made of a copper or a brass, a material capable of preventing adhesion of molten metal to the surface thereof, the guide member 9 can be easily pulled out of the cylinder head 2.

Referring again to FIGS. 4 and 5, in order to obtain a higher welding strength, each half-pipe 8 is preferred to be chamfered so that each end in its longitudinal direction is formed with a chamfer 8b and that each edge portion in its lateral direction has a chamfer 8c.

Preferably, the half-pipe 8 is made of the same metal material as the cylinder head 2. Alternatively, the half-pipe 8 is made of a metal material which has the same thermal expansion coefficient as the material for forming the cylinder head 2. More preferably, each half-pipe 8 may be made of a metal material having a higher durability than the material of the cylinder head 2.

After each half-pipe 8 has been attached to the cylinder head 2, the guide member 9 is pulled so as to be removed from the cooling water passage 7, and, as shown in FIG. 9, the groove 13 is filled with filler metal 11. In order to remove a welding stress, it is preferred to perform a shot peening, for example, on the surface of a first and a second layer of the filler metal.

Subsequently, the cylinder head 2 as a whole is introduced into an annealing furnace so as to receive an annealing treatment. Then, a final finishing treatment is performed to grind the surface of the filler metal 11 with the use of a grinding device such as a grinder, thereby rendering the inner surface 2a of the cylinder head 2 to be restored to its original state.

With the use of the method according to the present embodiment, the cylinder head 2 has only to be cut off at a shallow depth, thereby rendering the repairing operation to be completed easily with a low cost. Further, since each of the cooling water passages is repaired to be restored to its original state, there would be no any unfavorable changes brought to the cooling effect which should be provided by the cooling water passages.

What is claimed is:

1. A cylinder head that defines at least part of a combustion chamber in a fluid cooling type internal combustion engine that has cooling fluid passages separated from the combustion chamber by boundary walls, wherein at least a part of a cooling fluid passage is formed by a pipe portion having an inner surface that together with a portion of the boundary wall forms the cooling fluid passage; and wherein the pipe portion is a half pipe that has a semicircular cross section which is equal in size to a half cross section of the cooling fluid passage.

2. A fluid cooled internal combustion engine that has a combustion chamber, cylinder head and cooling fluid passages separated from the combustion chamber by boundry wall portions of the cylinder head, wherein at least a part of a cooling fluid passage is formed by a pipe portion having an inner surface that together with a portion of the boundary walls forms the cooling fluid passage; and wherein the pipe portion is a half pipe that has a semicircular cross section which is equal in size to a half cross section of the cooling fluid passage.

* * * * *